(12) United States Patent
Henry et al.

(10) Patent No.: US 10,780,367 B2
(45) Date of Patent: Sep. 22, 2020

(54) ADJUSTABLE TRACK START SWIMMING STARTING BLOCK

(71) Applicant: EVERLAST CLIMBING INDUSTRIES, INC., Minneapolis, MN (US)

(72) Inventors: Charles Henry, Missoula, MT (US); Shane Clagett, Stevensville, MT (US); John Florin, Missoula, MT (US)

(73) Assignee: EVERLAST CLIMBING INDUSTRIES, INC., Minneapolis, MN (US)

( * ) Notice: Subject to any disclaimer, the term of this patent is extended or adjusted under 35 U.S.C. 154(b) by 181 days.

(21) Appl. No.: 15/992,492

(22) Filed: May 30, 2018

(65) Prior Publication Data
US 2019/0366227 A1    Dec. 5, 2019

(51) Int. Cl.
*A63K 3/02*     (2006.01)
*F16D 41/16*   (2006.01)
*F16H 31/00*   (2006.01)

(52) U.S. Cl.
CPC .............. *A63K 3/023* (2013.01); *F16D 41/16* (2013.01); *F16H 31/002* (2013.01)

(58) Field of Classification Search
CPC ......... A63K 3/023; F16D 41/16; F16D 41/12; F16H 31/002; A63B 2022/0033; A63B 22/0046; A63B 23/0405; A63B 2244/20; A63B 26/00; A63B 2225/093; A63B 22/201; A63B 5/10; A61H 39/00; A61H 2201/164; A61H 2201/0192; A61H 2205/125; A61H 2201/16; A61H 2203/0406; Y10T 403/32426; Y10T 403/32434
See application file for complete search history.

(56) References Cited

U.S. PATENT DOCUMENTS 4,392,060 A * 7/1983 Ivy ...................... F03B 13/1815
                                                                    290/53
2009/0171229 A1* 7/2009 Saldarelli ............... A63B 69/12
                                                                    600/523

(Continued)

OTHER PUBLICATIONS

Spectrum Aquatics—Excellerator Starting Platform—Spectrumadmin—Apr. 19, 2016.*

*Primary Examiner* — Loan B Jimenez
*Assistant Examiner* — Andrew M Kobylarz
(74) *Attorney, Agent, or Firm* — McAndrews, Held & Malloy, Ltd.

(57) ABSTRACT

A track start wedge includes a housing, a ratchet gear assembly, and a locking pawl assembly. The ratchet gear assembly is disposed at least partially within the housing and includes a bar, a pinion gear at each end of the bar, and a ratchet gear between the ends of the bar. The locking pawl assembly is coupled to the housing and includes a locking pawl disengageably coupled to the ratchet gear and a spring operable to bias the locking pawl into engagement with the ratchet gear. The ratchet gear assembly is configured to rotate in unison in a first direction toward a front of the housing and a second direction toward a rear of the housing, but the locking pawl prevents rotation of the ratchet gear in the second direction when the locking pawl is engaged with the ratchet gear.

20 Claims, 16 Drawing Sheets

(56) References Cited

U.S. PATENT DOCUMENTS

| | | | |
|---|---|---|---|
| 2013/0095980 A1* | 4/2013 | Solanyk | A63B 5/10 |
| | | | 482/55 |
| 2015/0290553 A1* | 10/2015 | Stockinger | A63B 69/12 |
| | | | 4/496 |
| 2016/0114238 A1* | 4/2016 | Santino, Jr. | A63K 3/023 |
| | | | 340/4.13 |

* cited by examiner

ADJUSTABLE TRACK START SWIMMING STARTING BLOCK

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments are related to track start wedges used on swimming starting blocks. More specifically, various embodiments enhance the adjustability of a track start swimming starting block by providing a track start wedge having ratchet gear and locking pawl assemblies configured to provide free movement of the track start wedge in a first direction toward a front of a starting block while preventing movement in a second direction toward a rear of the starting block unless a knob is released to disengage the locking pawl assembly from the ratchet gear assembly.

BACKGROUND

Existing high-caliber starting blocks or platforms now come with back plates or wedges that allow swimmers to use a track start starting position, instead of pushing off from the front edge of the platform. The back plates or wedges along with grab rails provide swimmers with mechanisms to accomplish a more powerful start. Some of the back plate or wedge designs have included features for adjusting the position of the back plate or wedge. For example, the starting platform may include slots at various positions on the surface of the platform for receiving the insertion of a back plate or wedge, which may be cumbersome to move and have a limited number of selectable positions. As another example, the back plate or wedge may slide along a track on the starting platform and be secured in a user selected position by inserting a pin into a slot of the platform and/or wedge. However, the track designs utilizing the pin also have a limited number of selectable wedge positions. Specifically, the track designs utilizing the pin typically have around five (5) slots spaced several inches apart. Additionally, failure to manually secure the pin in the slot may cause the wedge to jam or fall off the starting platform.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

An adjustable track start swimming starting block is provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
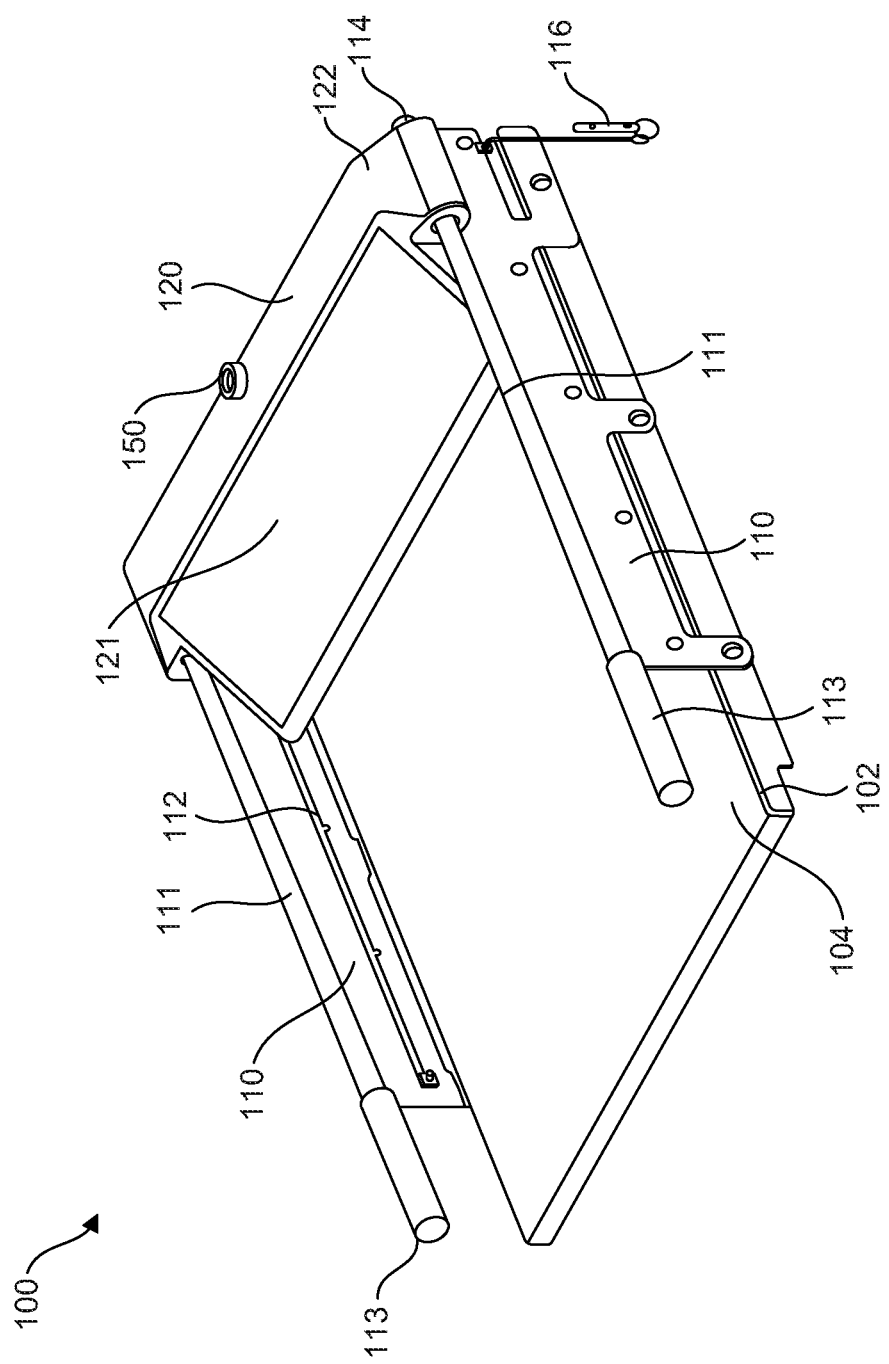
FIG. 1 illustrates a top, front perspective view of an exemplary starting platform having side rail assemblies and a track start wedge in accordance with an embodiment of the present disclosure.

Certain embodiments may be found in an adjustable track start swimming starting block. More specifically, certain embodiments provide a track start wedge 120 slidably coupled to side rail assemblies 110 attached to the starting platform 100. The track start wedge 120 includes a ratchet gear assembly 130 configured to linearly align the track start wedge 120 between the side rail assemblies 110 on the starting platform 100 and allows the wedge 120 to move freely from the rear of the starting platform 100 to the front of the starting platform 100. The track start wedge 120 includes a locking pawl assembly 140 configured to engage the ratchet gear assembly 130 to prevent the track start wedge 120 from moving backward toward the rear of the starting platform 100. The locking pawl assembly 140 may be disengaged from the ratchet gear assembly 130 by pulling a wedge adjustment knob 150. The disengagement of the locking pawl assembly 140 from the ratchet gear assembly 130 allows the track start wedge 120 to be adjusted in a rearward direction and/or to remove the track start wedge 120 from the starting platform 100. The track start wedge 120 may provide dozens of selectable wedge positions, such as approximately every quarter (¼) inch (defined as in a range from one-eighth (⅛) to one-half (½) inch). The track start wedge 120 includes a default engaged state thereby eliminating the need to manually secure the track start wedge 120 in a selected position. Specifically, the locking pawl assembly 140 may be biased into engagement with the ratchet gear assembly 130. The wedge adjustment knob 150 may be actuated to override the bias and disengage the locking pawl assembly 140 from the ratchet gear assembly 130.

FIG. 1 illustrates a top, front perspective view of an exemplary starting platform 100 having side rail assemblies 110 and a track start wedge 120 in accordance with an embodiment of the present disclosure. Referring to FIG. 1, the starting platform 100 may include a surrounding edge 102 defining a recessed top surface overlaid with a non-slip material, such as SAFETY-WALK by 3M or any suitable non-slip material. The starting platform 100 may be mounted on a base (not shown) on a pool deck adjacent a pool. The starting platform 100 includes a front that may be positioned adjacent a pool edge, a rear opposite the front, and two sides extending between the front and rear.

The starting platform 100 includes side rail assemblies 110 each attached by screws or any suitable attachment mechanism to the surrounding edge 102 at the sides of the starting platform 100. Each of the side rail assemblies 110 include a handle 113 at a first end of the side rail assembly 110 positioned at the front of the starting platform 100, an end cap at a second end of the side rail assembly 110 positioned at the rear of the starting platform 100, a slide rail 111 extending between the handle 113 and the end cap 114, and a location rack 112 on an inside surface of the side rail assembly 110. In various embodiments, the side rail assembly 110 may include a pin 116 and corresponding slot 115 configured to provide a redundant safety mechanism operable to prevent the track start wedge 120 from being removed from the slide rails 111 at the rear of the starting platform 100.

The starting platform 100 includes the track start wedge 120 slidably coupled to the slide rails 111 of the sliding rail assemblies 110. The track start wedge 120 includes an angled track start surface 121 having a non-slip material, such as SAFETY-WALK by 3M or any suitable non-slip material. The track start wedge 120 includes overhangs 122 that may partially wrap around the slide rails 111 of the sliding rail assemblies 110 when the track start wedge 120 is slidably coupled to the sliding rail assemblies 110. The overhangs 122 may house sliders 126 as described below at least with respect to FIGS. 5-6. The track start wedge 120 may include a wedge adjustment knob 150 configured to release the track start wedge 120 allowing movement of the track start wedge 120 toward the rear of the starting platform 100 and/or removal from the starting platform 100. In operation, certain embodiments provide that the track start wedge 120 is freely moveable to traverse linearly along the slide rails 111 toward the front of the starting platform 100 but may not be moved toward the rear of the starting platform unless the wedge adjustment knob 150 is actuated to disengage a locking pawl assembly 140 from a ratchet gear assembly 130 disposed within the track start wedge 120 as described in more detail below.

Figure 2:
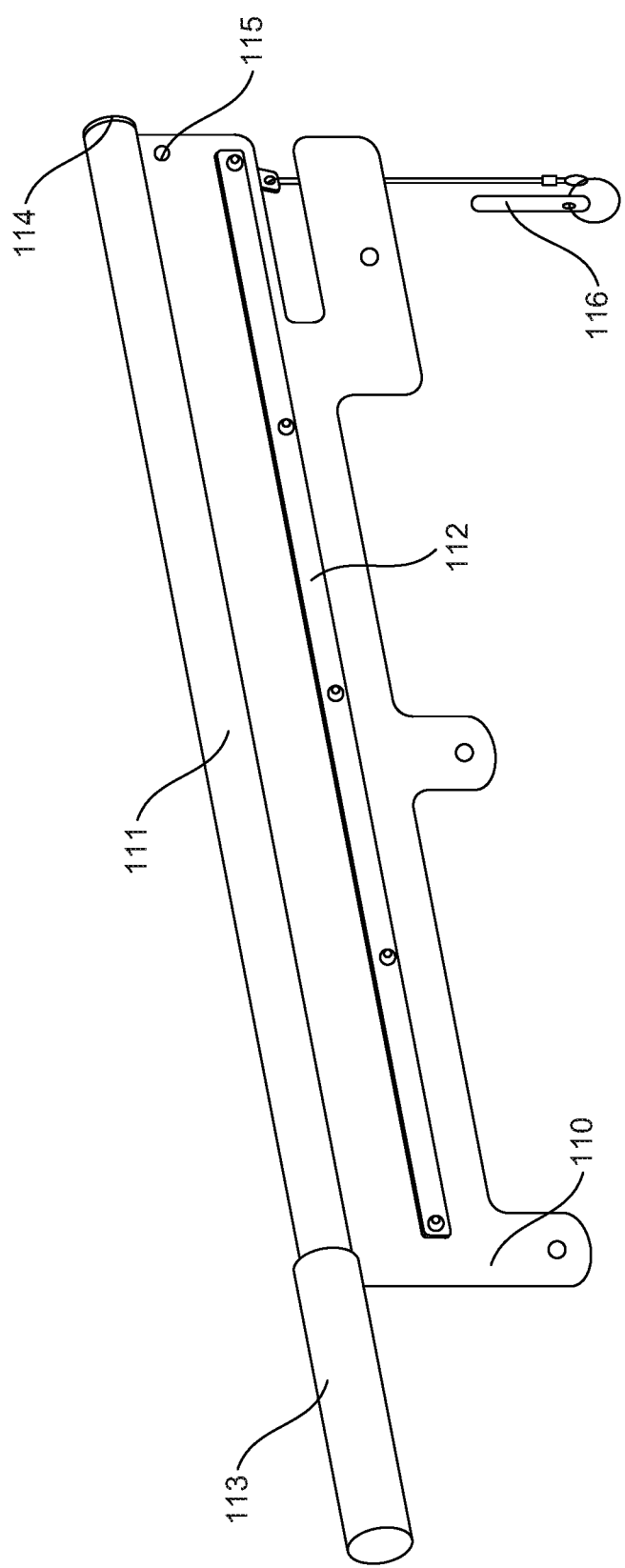
FIG. 2 illustrates a side perspective view of an exemplary side rail assembly in accordance with an embodiment of the present disclosure.
Figure 3:
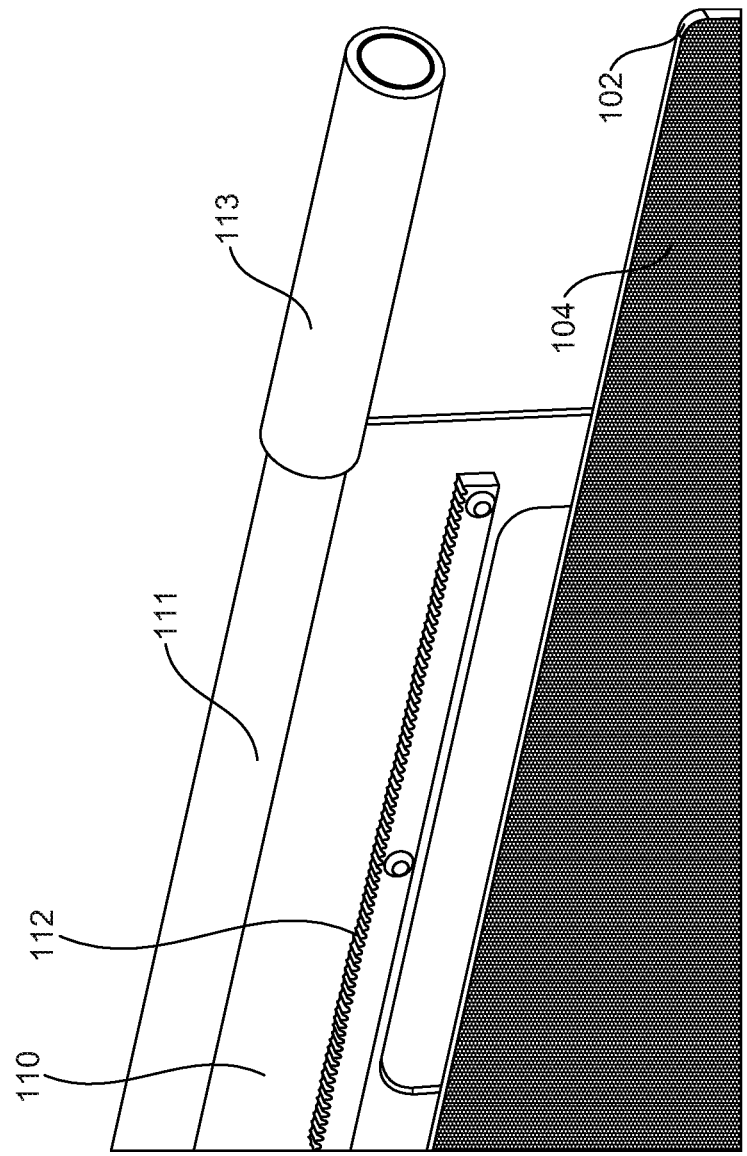
FIG. 3 illustrates a front, side perspective view of a portion of an exemplary side rail assembly in accordance with an embodiment of the present disclosure.

FIG. 2 illustrates a side perspective view of an exemplary side rail assembly 110 in accordance with an embodiment of the present disclosure. FIG. 3 illustrates a front, side perspective view of a portion of an exemplary side rail assembly 110 in accordance with an embodiment of the present disclosure. Referring to FIGS. 2-3, the side rail assembly 110 comprises a slide rail 111, a location rack 112, a handle 113, an end cap 114, a slot 115, and/or a pin 116, among other things. The slide rail assembly 110 is configured to be attached to a side of a starting platform 100 with the handle 113 positioned at a front of the starting platform 100 nearest a pool and the end cap 114 positioned at a rear of the starting platform 100. The slide rail 111 extends between the handle 113 and the end cap 114 and is configured to slidably couple within a slider 126 of a track start wedge 120 as described below at least with respect to FIGS. 5-6.

The handle 113 may include grip and is configured to be grasped and pulled by a user to assist in providing leverage for a powerful start from the starting platform 100. The end cap 114 may be provided for aesthetic purposes and to protect the end of the slide rail 111. The pin 116 is configured to be inserted into the slot 115 to provide a redundant safety mechanism to prevent the track start wedge 120 from inadvertently being removed from the side rail assembly 110. The location rack 112 may be a rack gear corresponding with a pinion gear 132 that together operate as a linear actuator for converting the circular motion of the pinion gear 132 to linear motion of the track start wedge 120 between the front of the starting platform 100 and the rear of the starting platform 100 along the location rack 112. The pinion gear 132 may be part of a ratchet gear assembly 130 of the track start wedge 120 that is described in more detail below.

Figure 4:
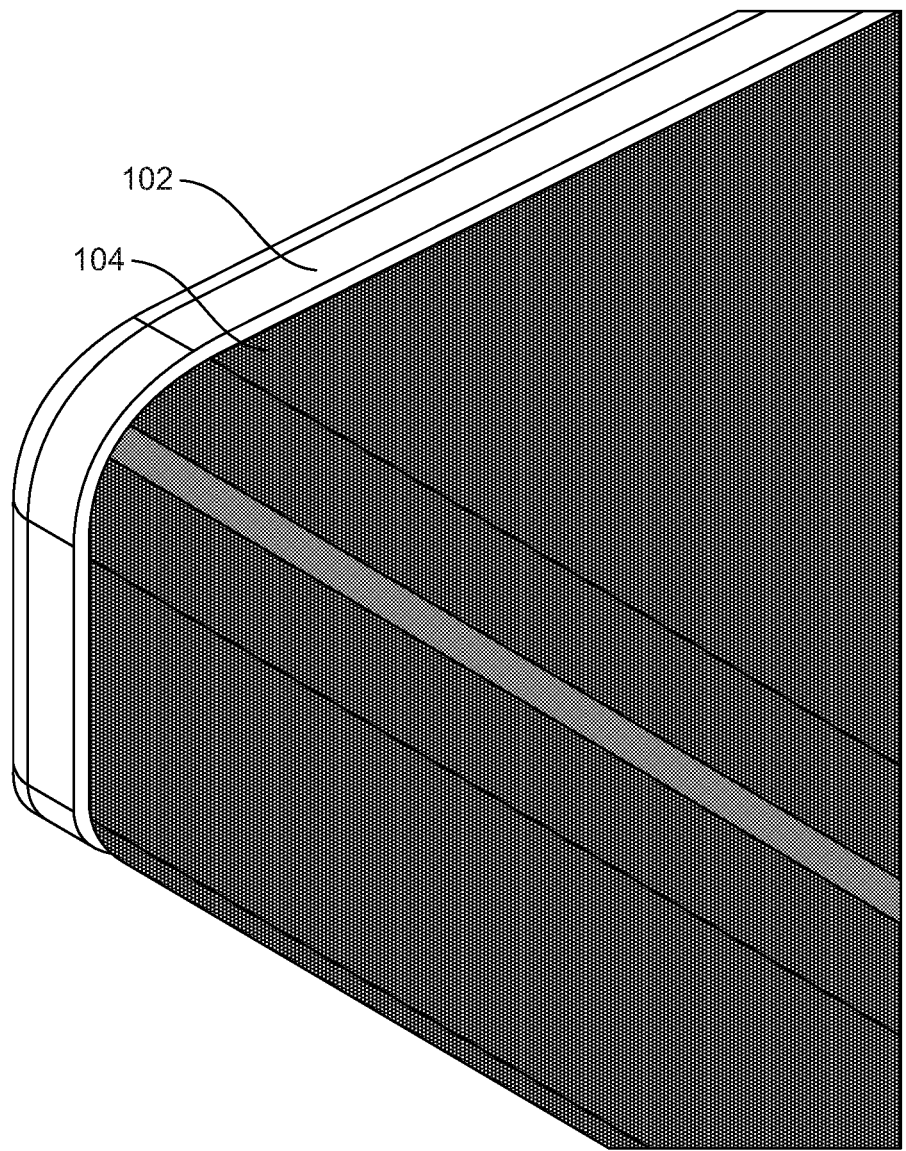
FIG. 4 illustrates a front, side perspective view of a portion of an exemplary starting platform having a recessed area configured to protect non-slip material edges in accordance with an embodiment of the present disclosure.

FIG. 4 illustrates a front, side perspective view of a portion of an exemplary starting platform 100 having a recessed area configured to protect non-slip material edges in accordance with an embodiment of the present disclosure. Referring to FIG. 4, the starting platform 100 includes edges 102 defining a recessed area. The recessed area may include non-slip material, such as SAFETY-WALK by 3M or any suitable non-slip material. The edges 102 of the starting platform 100 protect the edges of the non-slip material by aiding to prevent the edges of the non-slip material from being peeled away from the starting platform 100.

Figure 5:
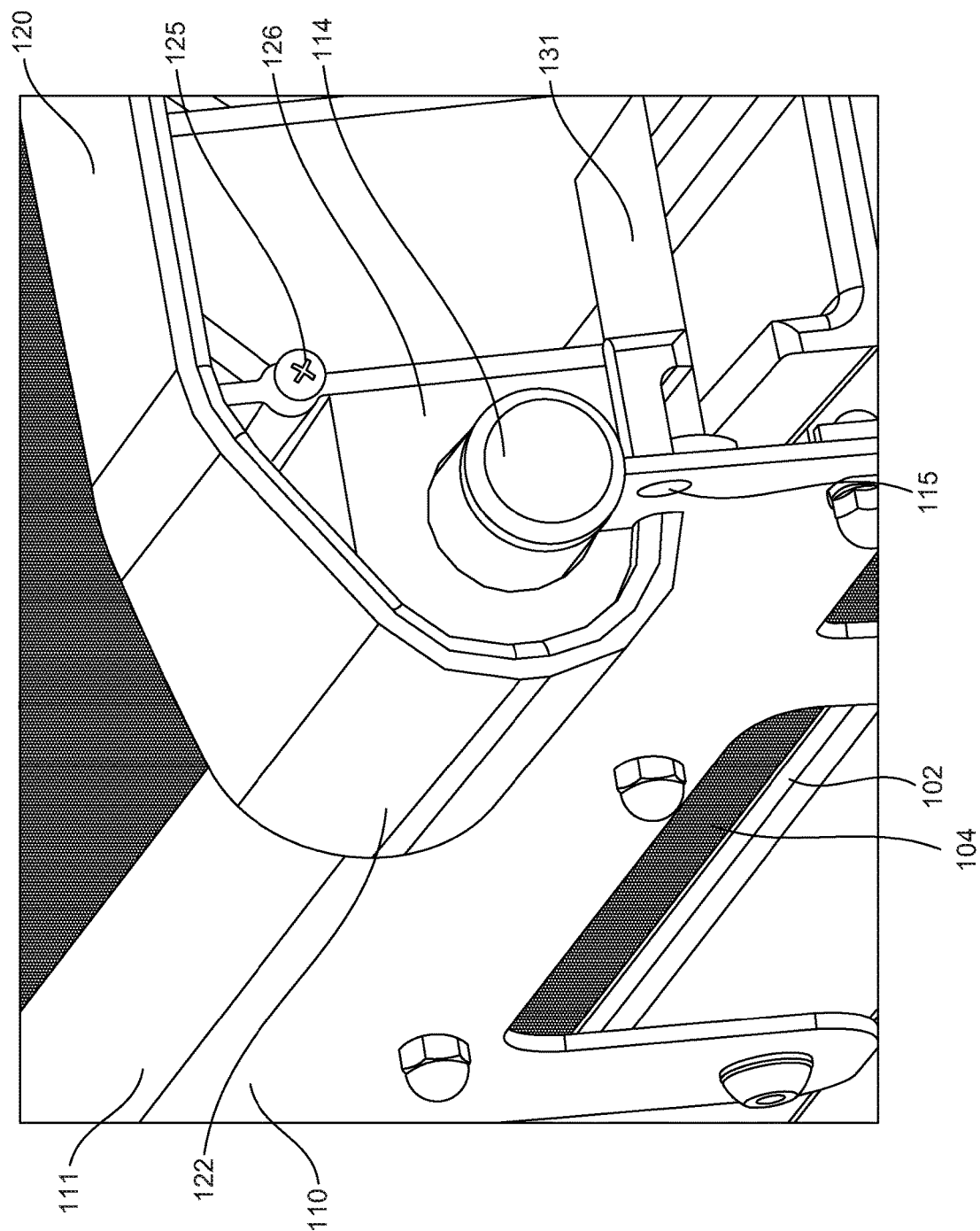
FIG. 5 illustrates a side, rear perspective view of a portion of an exemplary track start wedge slidably coupled to a side rail assembly of a starting platform in accordance with an embodiment of the present disclosure.
Figure 6:
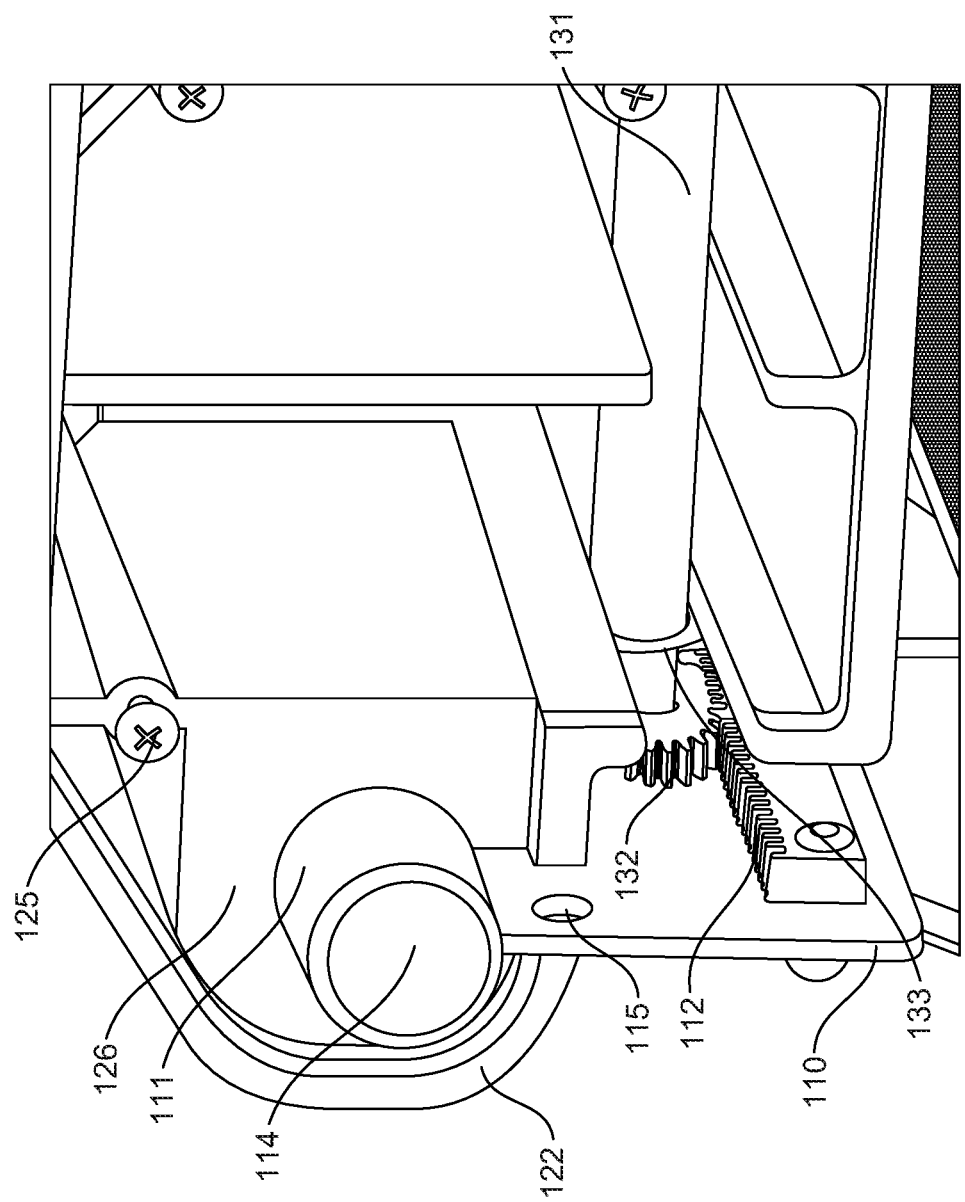
FIG. 6 illustrates a rear perspective view of a portion of an exemplary track start wedge slidably coupled to a side rail assembly of a starting platform in accordance with an embodiment of the present disclosure.

FIG. 5 illustrates a side, rear perspective view of a portion of an exemplary track start wedge 120 slidably coupled to a side rail assembly 110 of a starting platform 100 in accordance with an embodiment of the present disclosure. FIG. 6 illustrates a rear perspective view of a portion of an exemplary track start wedge 120 slidably coupled to a side rail assembly 110 of a starting platform 100 in accordance with an embodiment of the present disclosure. Referring to FIGS. 5-6, a track start wedge 120 is shown slidably coupled to a side rail assembly 110 that is attached to a side of a starting platform. In the illustrated embodiment of FIGS. 5-6, the track start wedge 120 is shown without a rear cover 123. As described in more detail below, the track start wedge 120 includes a rear cover 123 attached to the track start wedge 120 by screws 125 or any suitable attachment mechanism.

Still referring to FIGS. 5-6, the starting platform 100 includes edges 102 defining a recessed area that may include non-slip material 104. The side rail assembly 110 is attached to the edge 102 of the starting platform 100 at the side of the starting platform 100. The side rail assembly 110 includes a slide rail 111, a location rack 112, an end cap 114, and a slot 115.

Figure 7:
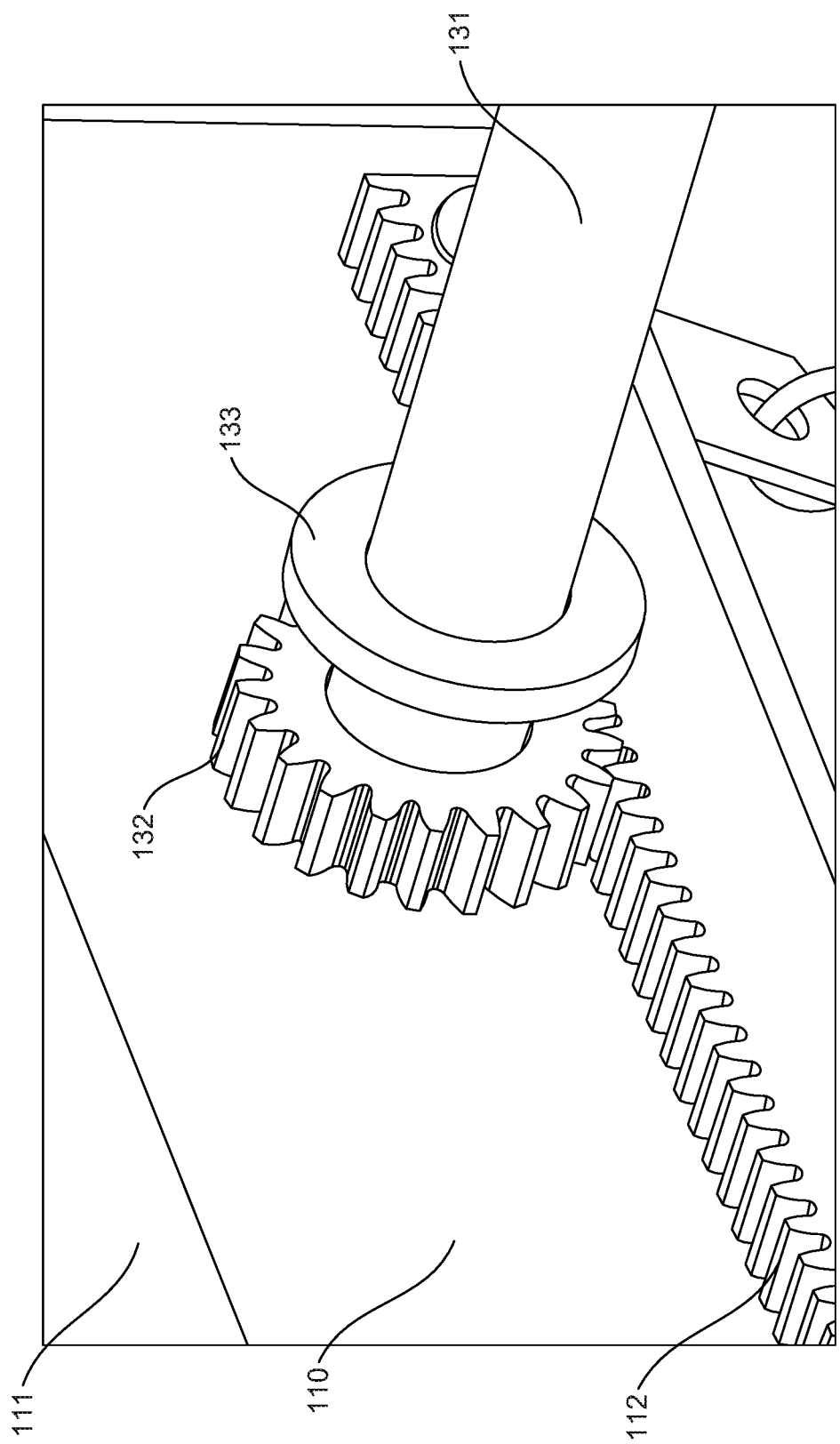
FIG. 7 illustrates a side perspective view of a pinion gear of an exemplary ratchet gear assembly engaged with a location rack of an exemplary side rail assembly in accordance with an embodiment of the present disclosure.

The track start wedge 120 may include an overhang 122 portion with a slider 126 disposed therein. The slider 126 may be an ultra-high-molecular-weight (UHMW) polyethylene material or any suitable material. The slider 126 may be secured to the track stat wedge 120 by set screws or any suitable attachment mechanism. The track start wedge 120 includes a ratchet gear assembly 130 having a keyway bar 131, pinion gears 132 and locating washer 133. FIG. 7 illustrates a side perspective view of a pinion gear 132 of an exemplary ratchet gear assembly 130 engaged with a location rack 112 of an exemplary side rail assembly 110 in accordance with an embodiment of the present disclosure. Referring to FIG. 7, the pinion gears 132 and locating washer 133 may be welded onto the keyway bar 131. The locating washer 133 may abut a portion of the track start wedge 120 to prevent the keyway bar 131 from sliding within the track start wedge 120. The pinion gears 132 may mate with and traverse gears of the locating racks 112 of the side assemblies 110.

Referring again to FIGS. 5-6, the slide rails 111 of the side rail assemblies 110 may slidably extend through the sliders 126 disposed in the overhang 122 of the track start wedge 120. The end cap 114 may protect the end of the slide rail 111 from damage. The slot 115 may be used for insertion of a pin 116 to prevent the track start wedge 120 from sliding off of the rear of the starting platform 100. In operation, as the track start wedge 120 is pushed forward into a selected swimming start position, the tight tolerance UHMW sliders 126 glide along the slide rails 111 and the pinion gears 132 rotate to travel along the location rack 112.

Figure 8:
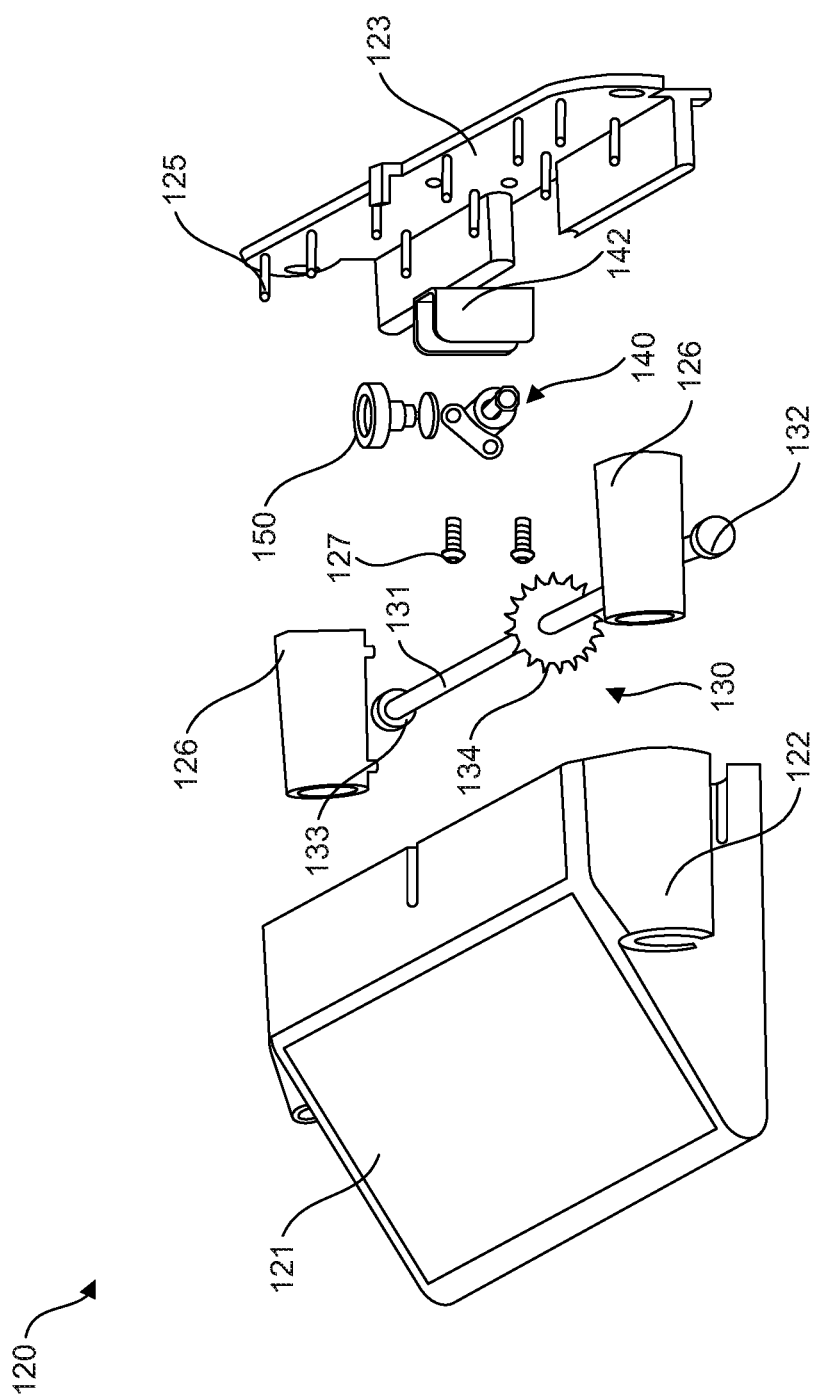
FIG. 8 illustrates an exploded view of an exemplary track start wedge in accordance with an embodiment of the present disclosure.

FIG. 8 illustrates an exploded view of an exemplary track start wedge 120 in accordance with an embodiment of the present disclosure. Referring to FIG. 8, the track start wedge 120 includes a front cover portion 121, 122 and a rear cover 123. The front cover portion includes an angled track start surface 121 and overhangs 122. The angled track start surface 121 may include a non-slip material. The angled track start surface 121 may be used by a swimmer to push off of during a start of a swimming race. The overhangs 122 may house sliders 126 configured to slidably couple with side rail assemblies 110 of a starting platform 100 as described above. The rear cover 123 may include fins 124 and attachment mechanisms 125 for securing the rear cover 123 to the front cover portion 121, 122.

The track start wedge 120 may include a ratchet gear assembly 130 and a locking pawl assembly 140 at least partially disposed within the front and rear covers 121, 122, 123. The ratchet gear assembly 130 may include a keyway bar 131, pinion gears 132, locating washers 133, and a ratchet gear 134 as described below at least with respect to FIGS. 9-11. The ratchet gear assembly 130 may be welded together or otherwise integrated to be a single uniform construction.

The locking pawl assembly 140 may be disposed in a locking pawl housing 142 and secured to the rear cover 123 of the track start wedge 120 by screws 127 or any suitable attachment mechanism. The locking pawl assembly 140 may be biased into engagement with the ratchet gear 134 of the ratchet gear assembly 130 as described below with reference to at least FIGS. 12-13. The locking pawl assembly 140 may prevent the ratchet gear assembly 130 from rotating toward the rear cover 123 when engaged with the ratchet gear 134. The locking pawl assembly 140 may include a wedge adjustment knob 150 that extends outside of the front and rear covers 121, 122, 123. In various embodiments, the wedge adjustment knob 150 may be grasped and pulled to disengage the locking pawl assembly 140 from the ratchet gear 134 to allow the ratchet gear assembly 130 to rotate toward the rear cover 123.

Figure 9:
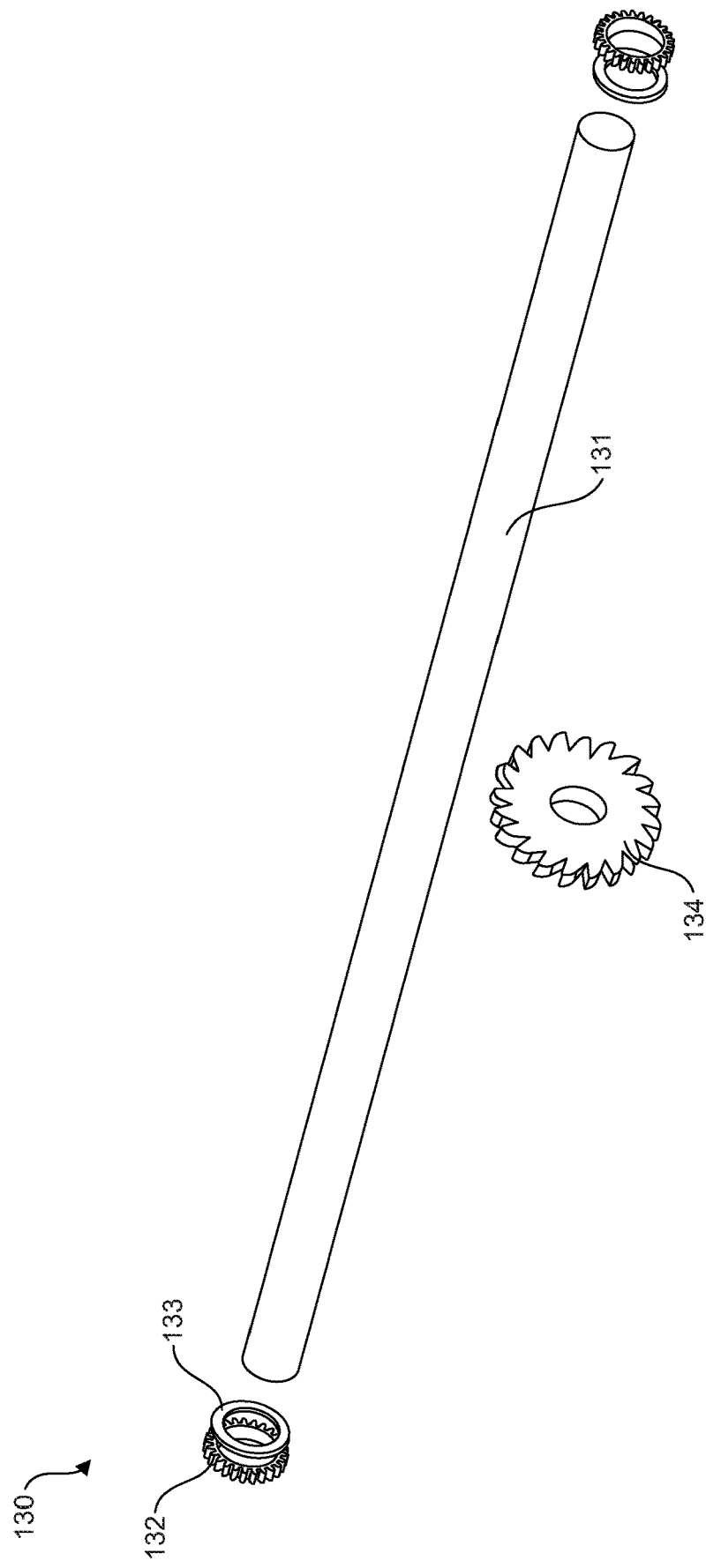
FIG. 9 illustrates an exploded view of an exemplary ratchet gear assembly in accordance with an embodiment of the present disclosure.
Figure 10:
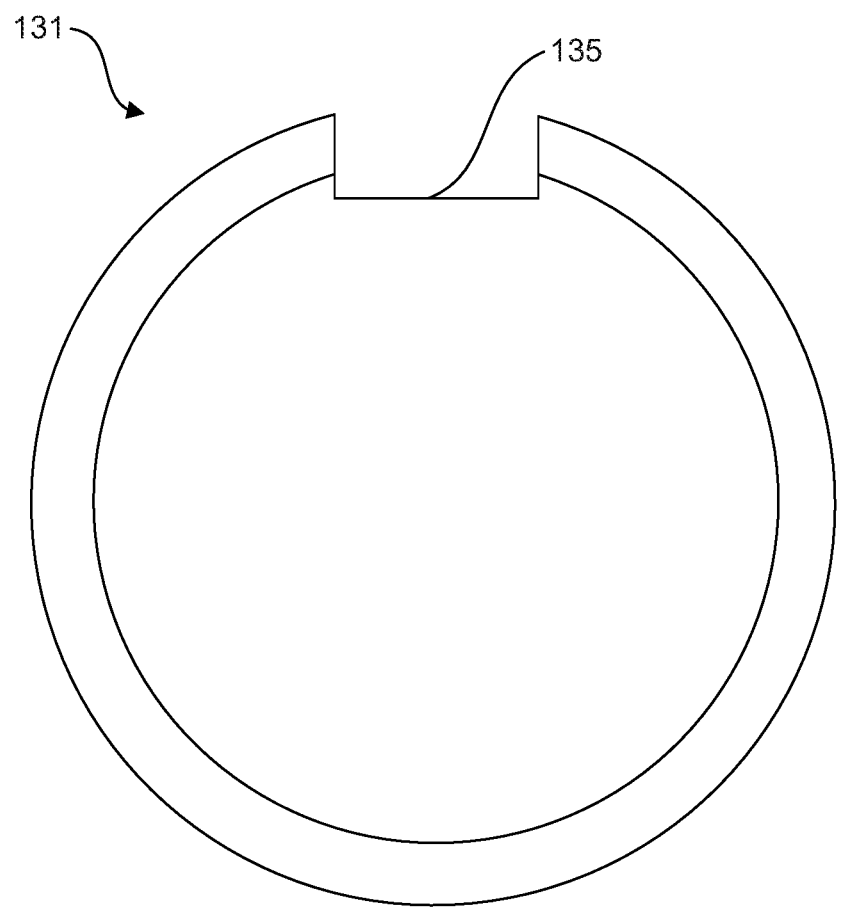
FIG. 10 illustrates an end elevation view of an exemplary keyway bar of an exemplary ratchet gear assembly in accordance with an embodiment of the present disclosure.
Figure 11:
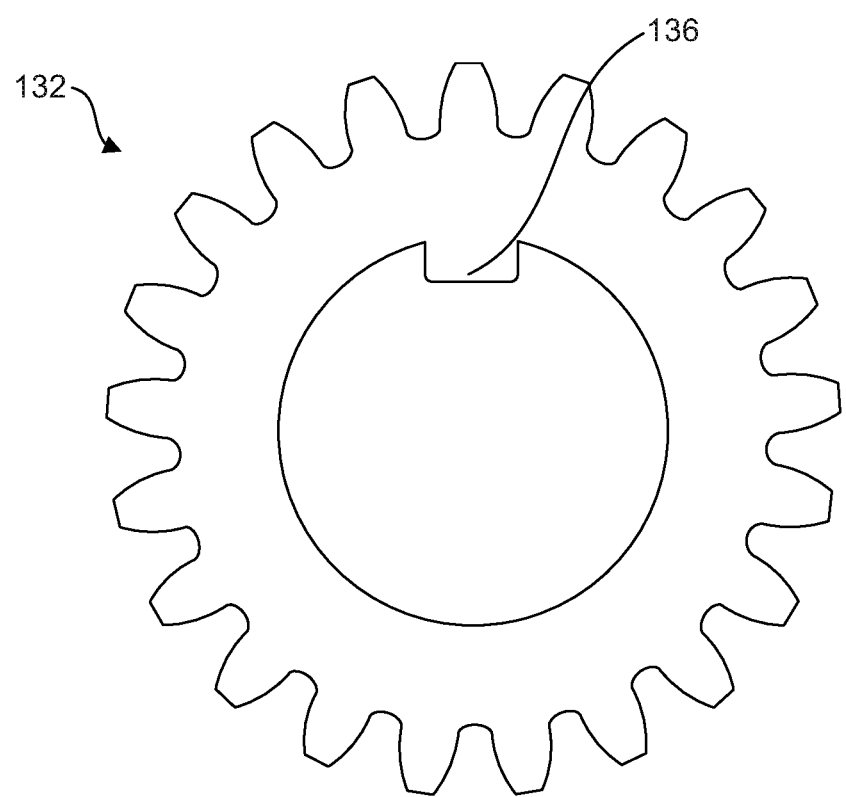
FIG. 11 illustrates an end elevation view of an exemplary pinion gear having a protrusion configured to mate with a keyway of the exemplary keyway bar of FIG. 10 in accordance with an embodiment of the present disclosure.

FIG. 9 illustrates an exploded view of an exemplary ratchet gear assembly 130 in accordance with an embodiment of the present disclosure. Referring to FIG. 9, the ratchet gear assembly 130 includes a keyway bar 131, pinion gears 132, locating washers 133, and ratchet gear 134. In various embodiments, the keyway bar 131 may include keyway slots 135 configured to align with protrusions 136 in pinion gears 132 as illustrated in FIGS. 10-11. FIG. 10 illustrates an end elevation view of an exemplary keyway bar 131 of an exemplary ratchet gear assembly 130 in accordance with an embodiment of the present disclosure. FIG. 11 illustrates an end elevation view of an exemplary pinion gear 132 having a protrusion 136 configured to mate with a keyway 135 of the exemplary keyway bar 131 of FIG. 10 in accordance with an embodiment of the present disclosure. Referring to FIGS. 9-11, the slotted 135 keyway bar 131 and the pinion gears 132 having protrusions 136 ensure that the pinion gears 132 on both ends of the keyway bar 131 are aligned and turn in unison to provide linear alignment of the track start wedge 120 between the side rail assemblies 110 on the starting platform 100 as described above.

Referring again to FIG. 9, the locating washers 133 are positioned on the keyway bar 131 such that the washers 133 abut portions of the track start wedge 120 to prevent movement of the keyway bar 131. The ratchet gear 134 may be disengageably coupled to a locking pawl 141 of the locking pawl assembly 140 described in more detail below in connection with at least FIGS. 12-13. In various embodiments, the keyway bar 131, pinion gears 132, locating washers 133, and ratchet gear 134 may be a single integrated component configured to rotate in unison in forward and backward directions. In an exemplary embodiment, the ratchet gear assembly 130 may only rotate in a forward direction when the locking pawl assembly 140 is engaged with the ratchet gear 134. For example, fins 124 of the rear cover 123 of the track start wedge 120 may push the keyway bar 131 to simultaneously rotate the pinion gears 132 and ratchet gear 134 when the track start wedge 120 is pushed in a forward direction. The locking pawl assembly 140 prevents rotation of the ratchet gear 134, and thereby the entire ratchet gear assembly 130, in the rear direction when the locking pawl assembly 140 is engaged with the ratchet gear 134.

Figure 12:
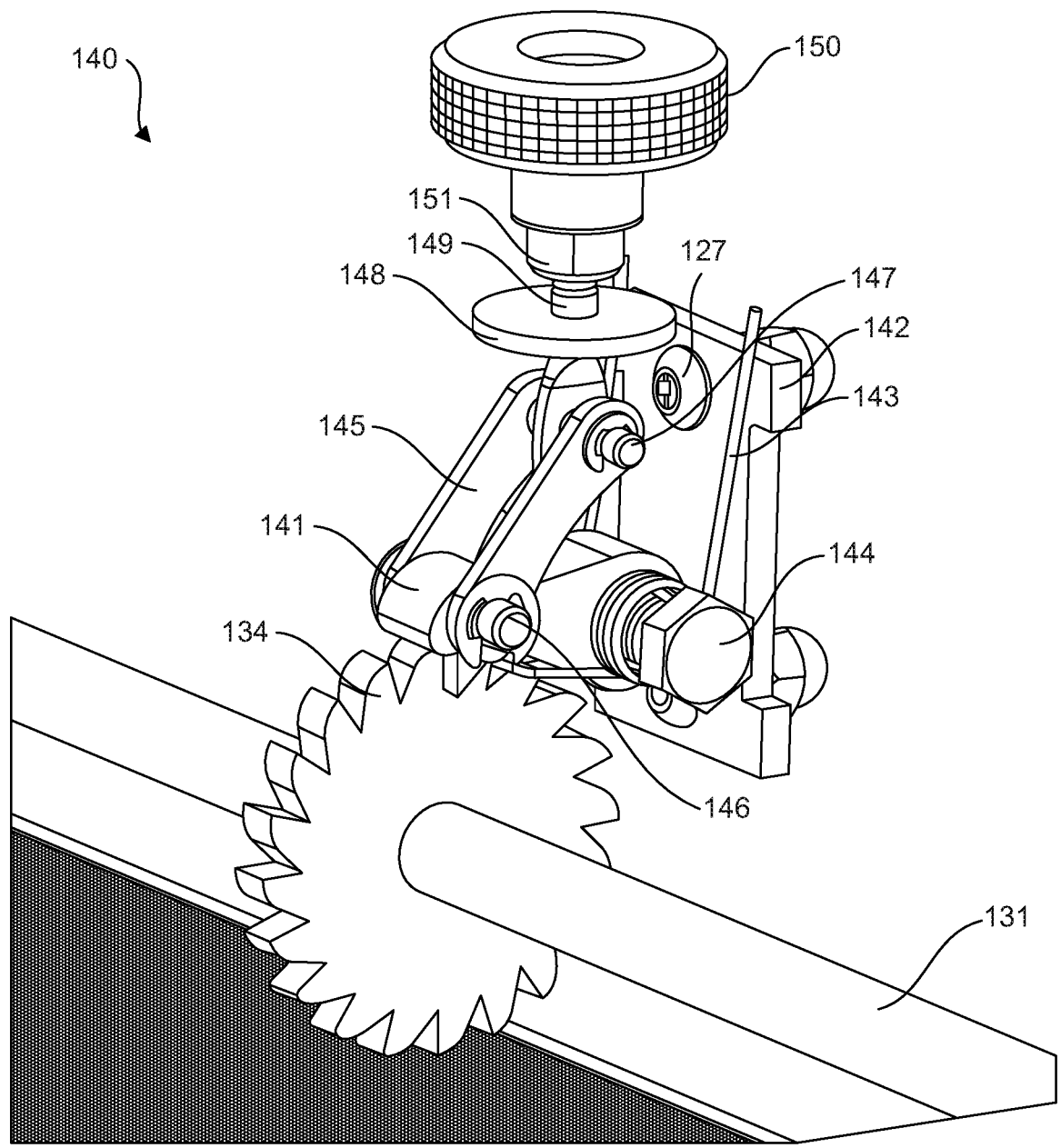
FIG. 12 illustrates a perspective view of an exemplary locking pawl assembly in accordance with an embodiment of the present disclosure.
Figure 13:
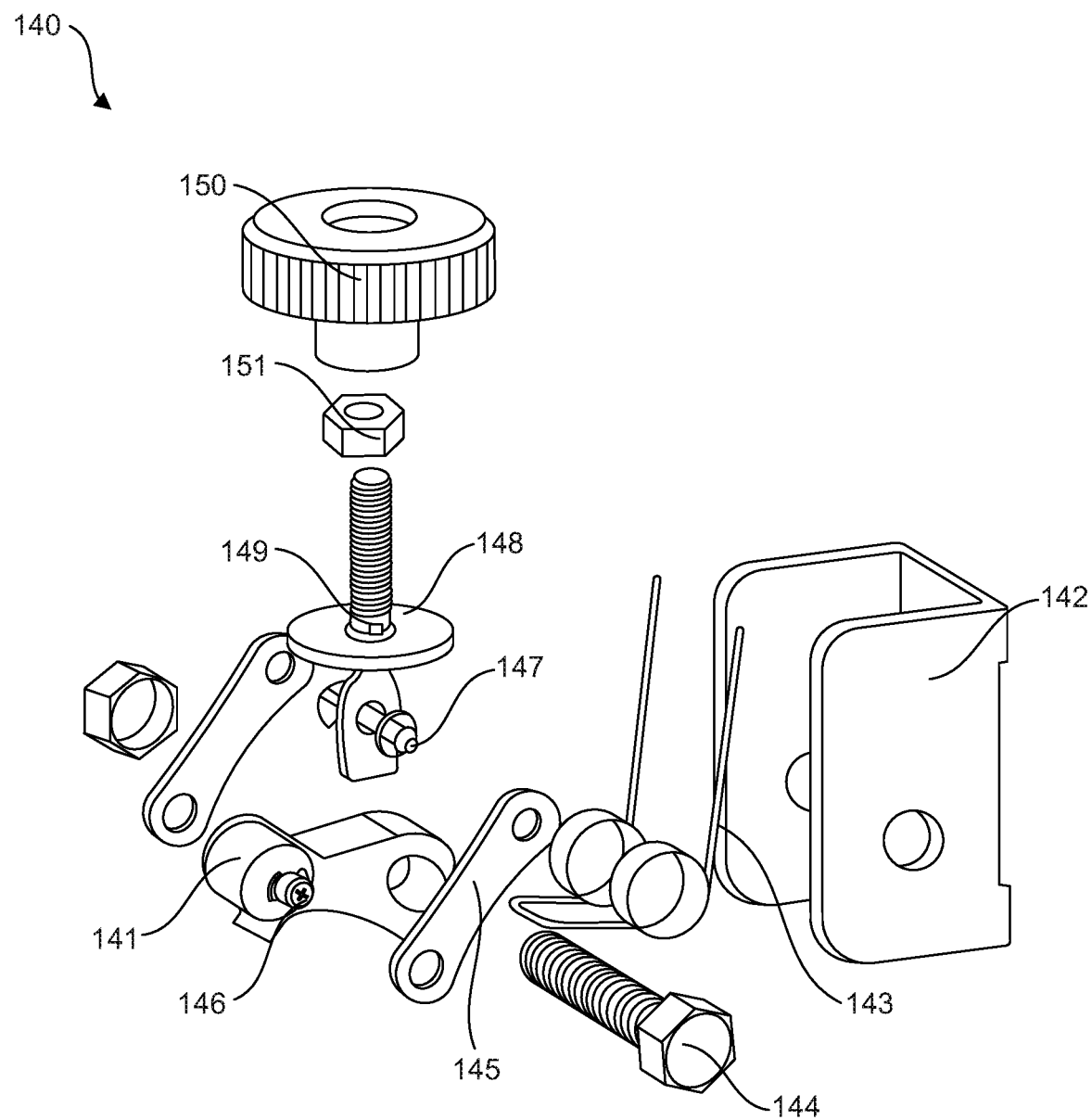
FIG. 13 illustrates an exploded view of an exemplary locking pawl assembly in accordance with an embodiment of the present disclosure.

FIG. 12 illustrates a perspective view of an exemplary locking pawl assembly 140 in accordance with an embodiment of the present disclosure. FIG. 13 illustrates an exploded view of an exemplary locking pawl assembly 140 in accordance with an embodiment of the present disclosure. Referring to FIGS. 12-13, the locking pawl assembly 140 includes a locking pawl 141, a housing 142, a torsion spring 143, lever arms 145, a stopping washer 148, a hanger screw 149, a wedge adjustment knob 150, and various attachment mechanisms 127, 144, 146, 147, 151.

The housing 142 may be connected to the rear cover 123 of the track start wedge 120 by screws 127 or any suitable attachment mechanism. The locking pawl 141 and torsion spring 143 may be pivotally attached to the housing 142 by a screw 144 secured by a nut. The locking pawl 141 may be configured to engage a ratchet gear 134 as described above with respect to at least FIGS. 8-9. The torsion spring 143 may be a double torsion spring 143 or any suitable member operable to bias the locking pawl 141 into engagement with the ratchet gear 134.

The locking pawl 141 may have a first end pivotally coupled by the screw 144 to the housing 142 and a second opposite end operable to disengageably couple with the ratchet gear 134. The second end of the locking pawl 141 may also be pivotally coupled to lever arms 145 by a clevis pin 146 or any suitable attachment mechanism. The lever arms 145 may have a first end coupled to the locking pawl 141 and a second end coupled to the hanger screw 149 by a clevis pin 147 or any suitable attachment mechanism.

The hanger screw 149 may include a first end coupled to the lever arms 145, a second end having a nut 151 for attaching to the wedge adjustment knob 150, and a stopping washer 148. The wedge adjustment knob 150 may be grasped and pulled to disengage the locking pawl 141 from the ratchet gear 134 by lifting the hanger screw 149. The lifting of the hanger screw 149 lifts the lever arms 145, which lifts the locking pawl 141 out of the gear teeth of the ratchet gear 134. The stopping washer 148 limits the distance the locking pawl assembly may be lifted when the wedge adjustment knob 150 is grasped and pulled. For example, the stopping washer 148 may be disposed within the track start wedge 120 and the wedge adjustment knob 150 may be provided outside of the track start wedge 120. The extension of the hanger screw 149 through an opening in the housing of the track start wedge 120 may be limited by the stopping washer 148 contacting the housing adjacent the opening in the housing of the track start wedge 120.

Figure 14:
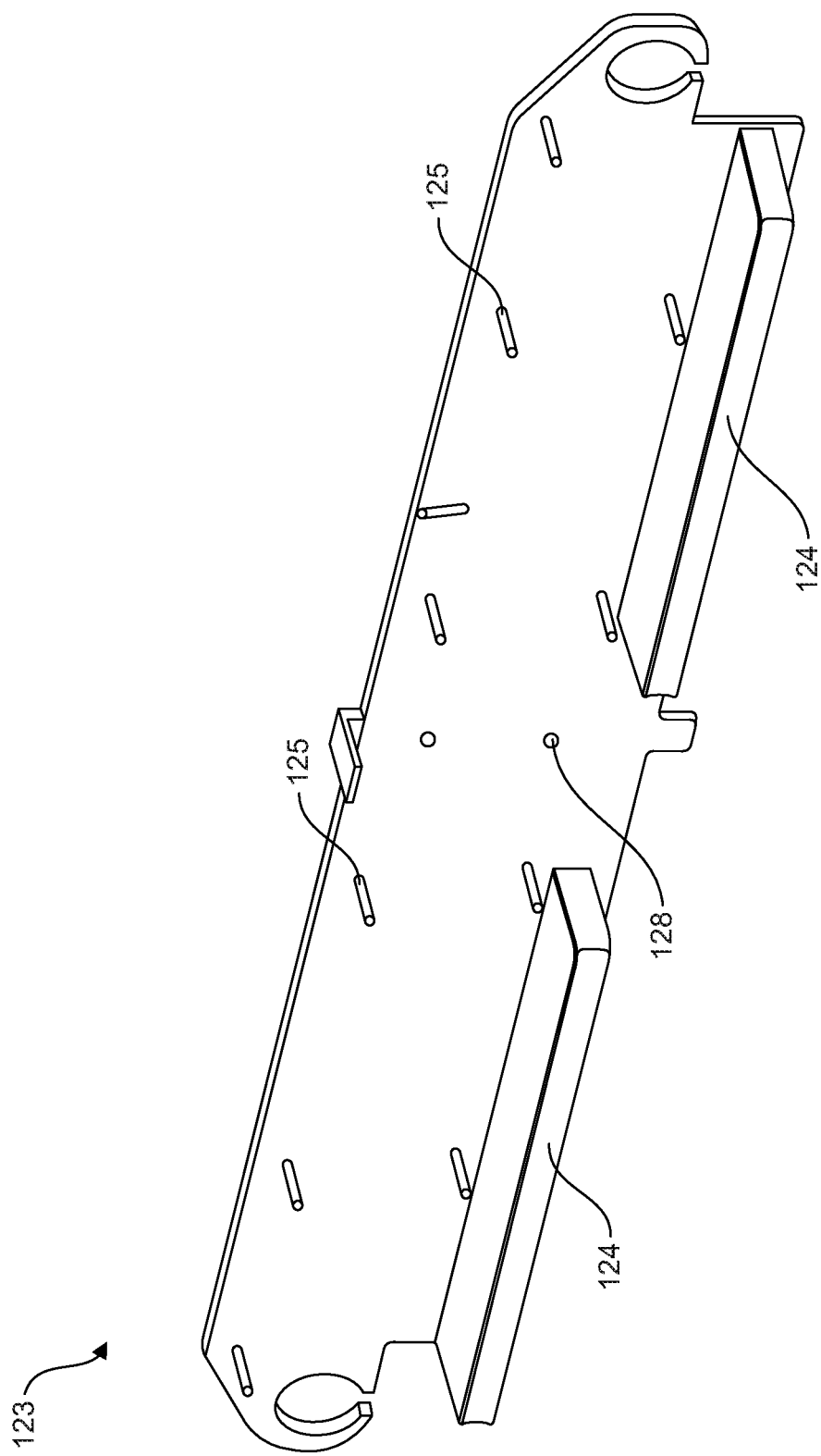
FIG. 14 illustrates an inner perspective view of an exemplary rear cover of an exemplary track start wedge in accordance with an embodiment of the present disclosure.

FIG. 14 illustrates an inner perspective view of an exemplary rear cover 123 of an exemplary track start wedge 120 in accordance with an embodiment of the present disclosure. Referring to FIG. 14, the rear cover 123 includes fins 124, track start wedge attachment mechanisms 125, and locking pawl housing attachment mechanisms 128. The fins 124 are positioned to be adjacent the keyway bar 131 of the ratchet gear assembly 130 when the rear cover 123 is attached to the track start wedge front portion 121, 122. The fins 124 are configured to push the keyway bar 131 when the track start wedge 120 is moved in a first direction toward the front of the track start wedge 120. The track start wedge attachment mechanisms 125 may be screws or any suitable attachment mechanism configured to secure the rear cover 123 to the front portion 121, 122 of the track start wedge 120. The locking pawl housing attachment mechanisms 128 may be threaded holes or any suitable attachment mechanism corresponding with the attachment mechanisms 127 of the locking pawl assembly 140. For example, the locking pawl housing 142 may be secured to the rear cover 123 by screws 127 extending through the housing 142 and into threaded holes 128 in the rear cover 123.

Figure 15:
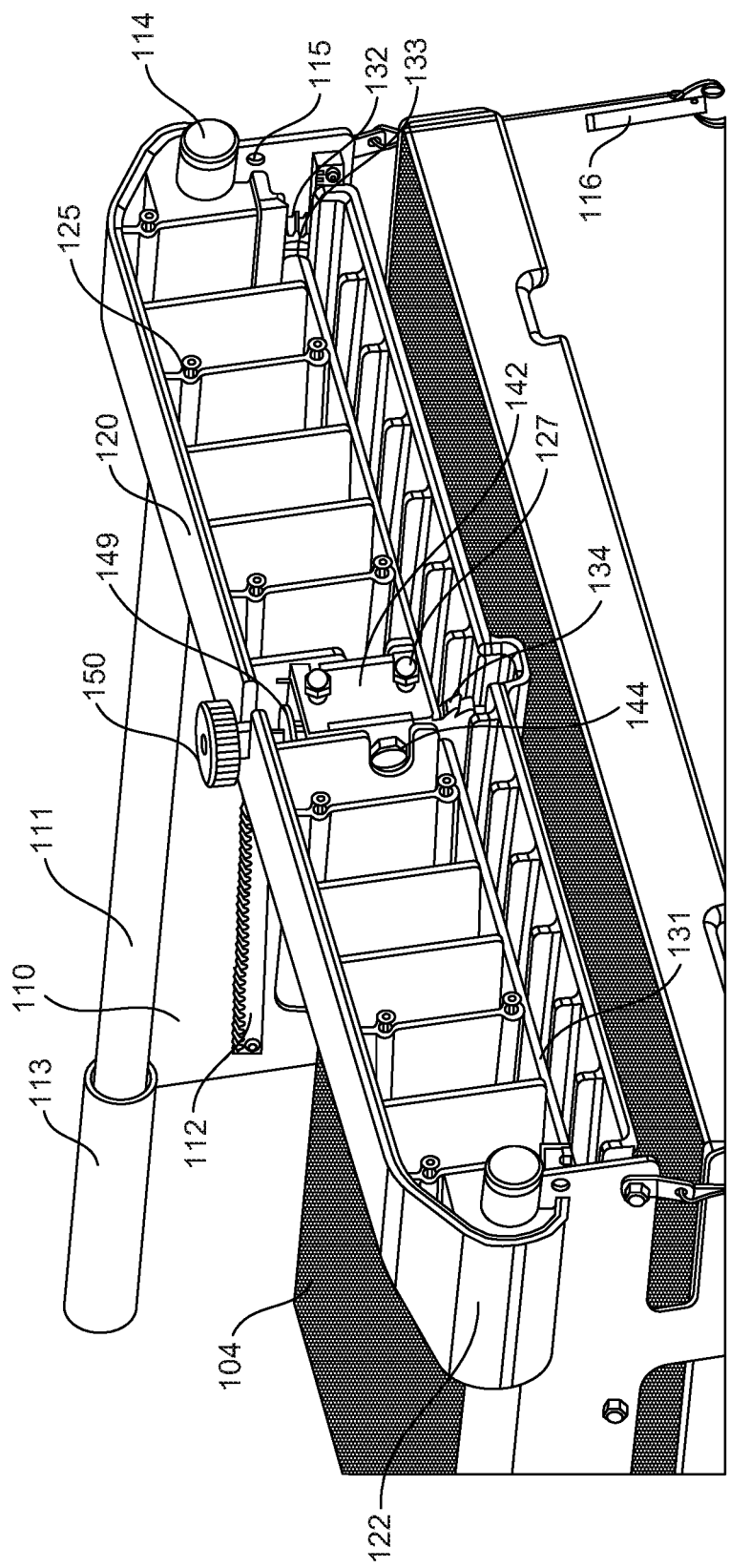
FIG. 15 illustrates a rear perspective view of an exemplary track start wedge without a rear cover and slidably coupled to side rail assemblies of a starting platform in accordance with an embodiment of the present disclosure.
Figure 16:
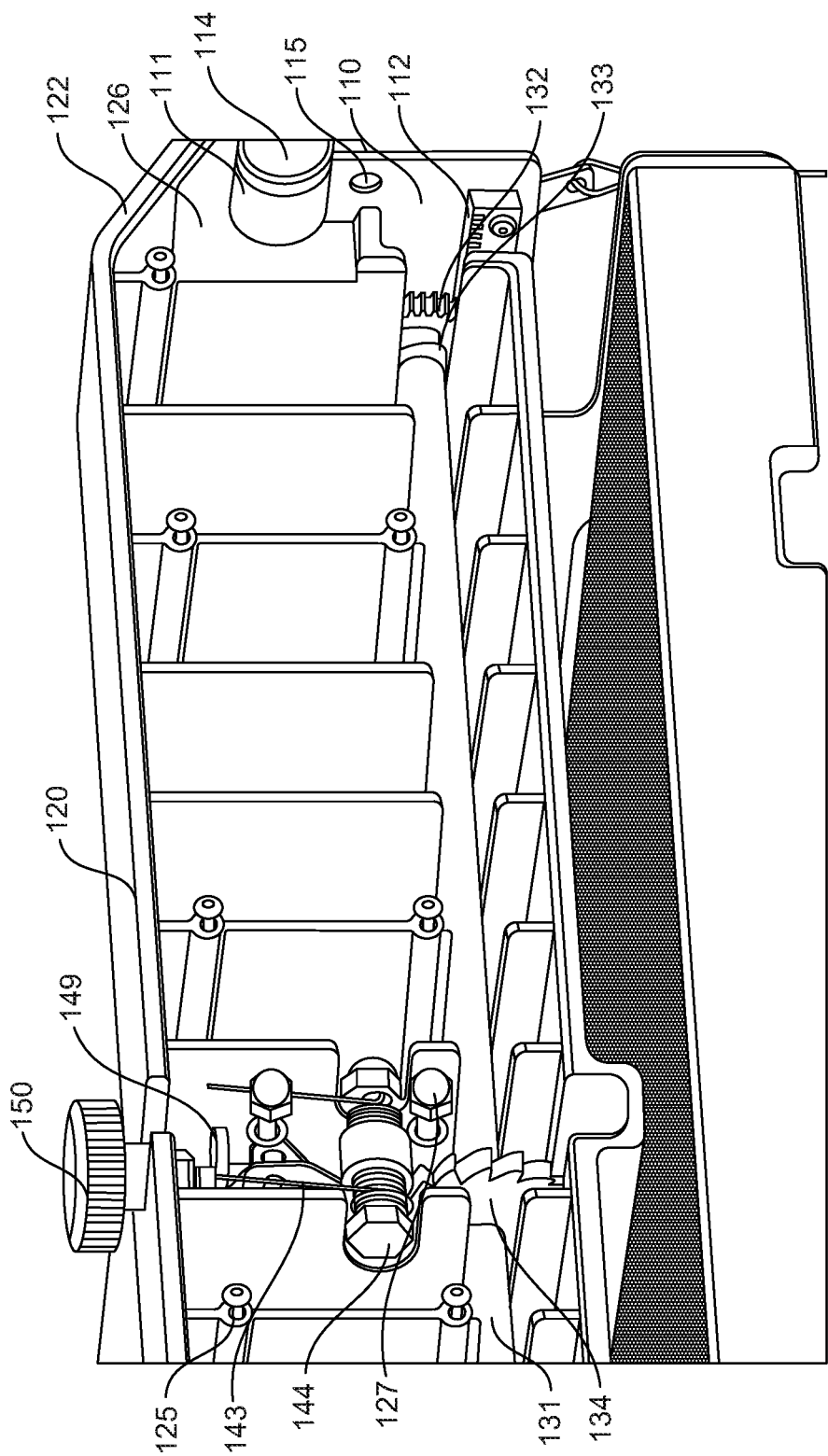
FIG. 16 illustrates a rear perspective view of a portion of an exemplary track start wedge without a rear cover and slidably coupled to side rail assemblies of a starting platform in accordance with an embodiment of the present disclosure.

FIG. 15 illustrates a rear perspective view of an exemplary track start wedge 120 without a rear cover 123 and slidably coupled to side rail assemblies 110 of a starting platform 100 in accordance with an embodiment of the present disclosure. FIG. 16 illustrates a rear perspective view of a portion of an exemplary track start wedge 120 without a rear cover 123 and slidably coupled to side rail assemblies 110 of a starting platform 100 in accordance with an embodiment of the present disclosure. Referring to FIGS. 15-16, side rail assemblies 110 are attached to sides of a starting platform 100. The starting platform includes a top surface having a non-slip material 104 to prevent a swimmer from slipping. The side rail assemblies 110 include a slide rail 111, a location rack 112, a handle 113, an end cap 114, a pin 116, and a slot 115. The end cap 114 may prevent damage to the slide rails 111. The handle 113 may be grasped by a swimmer on the starting platform 100 to provide a more powerful start at the beginning of a swimming race. The track start wedge 120 is slidably coupled to the slide rails 111 of the side rail assemblies 110. For example, the slide rails 111 may extend through sliders 126 disposed within overhangs 122 of the track start wedge 120. The pin 116 may be inserted into slot 115 when the track start wedge 120 is slidably coupled to the side rail assemblies 110 to act as a safety mechanism to prevent removal of the track start wedge 120 from the side rail assemblies 110.

The track start wedge 120 may include a ratchet gear assembly 130 having a keyway bar 131, pinion gears 132, locating washer 133, and ratchet gear 134. The ratchet gear assembly 130 may be a single integrated piece configured to rotate in unison. The pinion gears 132 may be configured to mate with and linearly traverse the locating racks 112 of the side rail assemblies 110. The locating washers 133 may be operable to abut an internal portion of the track start wedge 120 to maintain alignment of the keyway bar 131. The ratchet gear 134 may disengageably couple with a locking pawl assembly 140.

The locking pawl assembly 140 may include a locking pawl 141 biased into engagement with the ratchet gear 134 by a torsion spring 143. The locking pawl 141 and torsion spring 143 may be attached to a locking pawl housing 142 by a screw 144 or any suitable attachment mechanism. The locking pawl housing 142 may be attached to the rear cover (not shown) of the track start wedge 120 by screws 127 or any suitable attachment mechanism. The rear cover (not shown) may be attached to the track start wedge 120 by screws 125 or any suitable attachment mechanism. The locking pawl assembly 140 may include a wedge adjustment knob 150 and stopping washer 148. The wedge adjustment knob 150 may be grasped and pulled by a force that exceeds the bias force of the torsion spring 143 to manually disengage the locking pawl 141 from the ratchet gear 134, thereby allowing the keyway bar 131 to rotate backward to move the track start wedge 120 toward the rear of the starting platform 100. The stopping washer 148 may limit the distance the wedge adjustment knob 150 may be pulled away from the track start wedge 120.

In operation, a swimmer may choose a position for the track start wedge 120 by sliding the wedge 120 forward on the slide rails 111 of the side rail assemblies 110. The track start wedge 120 may slide freely in a first direction toward the front of the starting platform 100. As the track start wedge 120 is pushed forward, a ratchet gear assembly 130 disposed within the wedge 120 may rotate forward. More specifically, a keyway bar 131 having a ratchet gear 134 and pinion gears 132 may rotate in a first direction toward the front of the starting platform 100. The pinion gears 132 may travel linearly on corresponding location racks 112 positioned on an inner surface of the side rail assemblies 110. A locking pawl 141 may be biased by a spring 143 into engagement with the ratchet gear 134. The locking pawl 141 may allow the ratchet gear 134 to freely pivot in the first direction toward the front of the starting platform 100 but may prevent the ratchet gear 134 from rotating in a second direction, opposite the first direction, toward the rear of the starting platform 100.

If the swimmer desires to move the track start wedge 120 toward the rear of the starting platform 100, the swimmer may grasp and pull the wedge adjustment knob 150 to disengage the locking pawl 141 from the ratchet gear 134 and, while the locking pawl 141 is disengaged from the ratchet gear 134, push the wedge 120 back toward the rear of the starting platform 100. Once the wedge position is selected by the swimmer, the swimmer may take a track start position grasping the handles 113 of the side rail assemblies 110 and placing a foot on the starting surface 121 of the track start wedge 120. The swimmer may then pull the handles 113 and push of the starting surface 121 to dive into a pool adjacent to the starting platform 100.

The track start wedge 120 provides a high number of adjustment settings (e.g., selectable starting positions approximately every one-quarter (¼) inch) and is automatically engaged such that a user does not have to lock the wedge 120 into a selected position. Instead, unless overridden by manually actuating the wedge adjustment knob 150, the track start wedge 120 is constantly prevented from moving toward the rear of the starting platform 100. In various embodiments, the number of adjustment settings and spacing between the settings may correspond to the number of teeth and the spacing between the teeth of the location racks 112 on the inside surfaces of the side rail assemblies 110.

Various embodiments provide a track start wedge 120 configured to slide on side rail assemblies 110 between a rear and a front of a starting platform 100. The track start wedge 120 may comprise a housing 121, 122, 123, a ratchet gear assembly 130, and a locking pawl assembly 140. The housing 121, 122, 123 may include a front 121, a rear 123 opposite the front 121, and two sides each extending between the front 121 and the rear 123. The ratchet gear assembly 130 may be disposed at least partially within the housing 121, 122, 123. The ratchet gear assembly 130 may comprise a bar 131 having a first end and a second end. The bar 131 may extend between the two sides of the housing 121, 122, 123. The ratchet gear assembly 130 may comprise a pinion gear 132 at each of the first end and the second end of the bar 131. The ratchet gear assembly 130 may comprise a ratchet gear 134 between the first end and the second end of the bar 131. The locking pawl assembly 140 may be coupled to the housing 121, 122, 123. The locking pawl assembly 140 may comprise a locking pawl 141 disengageably coupled to the ratchet gear 134 and a spring 143 operable to bias the locking pawl 141 into engagement with the ratchet gear 134. The bar 131, the pinion gear 132 at each of the first end and the second end of the bar 131, and the ratchet gear 134 are configured to rotate in unison in a first direction toward the front 121 of the housing 121, 122, 123 and a second direction toward the rear 123 of the housing 121, 122, 123 if the locking pawl 141 is not engaged with the ratchet gear 134. The bar 131, the pinion gear 132 at each of the first end and the second end of the bar 131, and the ratchet gear 134 are configured to rotate in unison in the first direction if the locking pawl 141 is engaged with the ratchet gear 134. The locking pawl 141 prevents rotation of the ratchet gear 134 in the second direction when the locking pawl 141 is engaged with the ratchet gear 134.

In a representative embodiment, the track start wedge 120 comprises a slider 126 at each of the two sides of the housing 121, 122, 123. The slider 126 at each of the two sides of the housing 121, 122, 123 may be operable to slidably couple to a slide rail 111 attached to each of two sides of a starting platform 100. In an exemplary embodiment, the slider 126 at each of the two sides of the housing 121, 122, 123 is constructed of ultra-high-molecular-weight polyethylene. In certain embodiments, the housing 121, 122, 123 may comprise an overhang 122 at each of the two sides. The slider 126 at each of the two sides of the housing 121, 122, 123 is disposed in the overhang 122 at each of the two sides of the housing 121, 122, 123. In various embodiments, the pinion gear 132 at each of the first end and the second end of the bar 131 is operable to mate with and linearly traverse a location rack 112 on side rail assemblies 110 attached to each of two sides of a starting platform 100. In a representative embodiment, the pinion gear 132 at each of the first end and the second end of the bar 131 and the ratchet gear 134 are welded to the bar 131. In an exemplary embodiment, the bar 131 comprises a slot 135 at each of the first end and the second end. The pinion gear 132 at each of the first end and the second end of the bar comprises a protrusion 136 configured to mate with the slot 135 at each of the first end and the second end of the bar 131 to align the pinion gear 132 at the first end of the bar 131 with the pinion gear 132 at the second end of the bar 131. In certain embodiments, the front 121 of the housing 121, 122, 123 has an angled track start surface comprising a non-slip material 121. In various embodiments, the ratchet gear assembly 130 comprises at least one locating washer 133 operable to abut a portion of the housing 121, 122, 123 to align the bar 131 within the housing 121, 122, 123.

In an exemplary embodiment, the locking pawl assembly 140 comprises a locking pawl housing 142 coupled to the rear 123 of the housing 121, 122, 123. In a representative embodiment, the locking pawl 141 comprises a first end and a second end. The first end of the locking pawl 141 may be pivotally coupled to the locking pawl housing 142 and the second end of the locking pawl 141 may be disengageably coupled to the ratchet gear 134. In certain embodiments, the locking pawl assembly 140 may comprise at least one lever arm 145 having a first end and a second end. The first end of the at least one lever arm 145 may be pivotally coupled to the second end of the locking pawl 141. In various embodiments, the locking pawl assembly 140 may comprise a hanger screw 149 having a first end and a second end. The second end of the at least one lever arm 145 may be pivotally coupled to the first end of the hanger screw 149. In a representative embodiment, the locking pawl assembly 140 may comprise a wedge adjustment knob 150 coupled to the second end of the hanger screw 149. In an exemplary embodiment, the wedge adjustment knob 150 may be configured to be pulled to disengage the locking pawl 141 from the ratchet gear 134. In various embodiments, the locking pawl assembly 140 may comprise a stopping washer 148 configured to restrict a distance that the wedge adjustment knob 150 is pulled.

In certain embodiments, the locking pawl assembly 140 comprises a wedge adjustment knob 150 coupled to the locking pawl 141. The operation of the wedge adjustment knob 150 may disengage the locking pawl 141 from the ratchet gear 134. In a representative embodiment, the wedge adjustment knob 150 may be accessed outside of the housing 121, 122, 123. In an exemplary embodiment, the spring 143 may be a double torsion spring. In various embodiments, the rear 123 of the housing 121, 122, 123 comprises at least one fin 124 configured to apply pressure to the bar 131 to rotate the ratchet gear assembly 130 in the first direction.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the terms "exemplary" and "example" mean serving as a non-limiting example, instance, or illustration. As used herein, the term "e.g." introduces a list of one or more non-limiting examples, instances, or illustrations. As utilized herein, a structure that is "configured" to and/or "operable" to perform a function requires that the structure is more than just capable of performing the function, but is actually made to perform the function, regardless of whether the function is actually performed.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present disclosure will include all embodiments falling within the scope of the appended claims.

What is claimed is:

1. A track start wedge comprising:
   a housing comprising:
      a front,
      a rear opposite the front, and
      two sides each extending between the front and the rear;
   a ratchet gear assembly disposed at least partially within the housing, the ratchet gear assembly comprising:
      a bar having a first end and a second end, the bar extending between the two sides of the housing,
      a pinion gear at each of the first end and the second end of the bar, and
      a ratchet gear between the first end and the second end of the bar; and
   a locking pawl assembly coupled to the housing, the locking pawl assembly comprising:
      a locking pawl disengageably coupled to the ratchet gear, and
      a spring operable to bias the locking pawl into engagement with the ratchet gear,
   wherein the bar, the pinion gear at each of the first end and the second end of the bar, and the ratchet gear are configured to rotate in unison in a first direction toward the front of the housing and a second direction toward the rear of the housing if the locking pawl is not engaged with the ratchet gear, and
   wherein the bar, the pinion gear at each of the first end and the second end of the bar, and the ratchet gear are configured to rotate in unison in the first direction if the locking pawl is engaged with the ratchet gear, the locking pawl preventing rotation of the ratchet gear in the second direction when the locking pawl is engaged with the ratchet gear.

2. The track start wedge of claim 1, comprising a slider at each of the two sides of the housing, the slider at each of the two sides of the housing operable to slidably couple to a slide rail attached to each of two sides of a starting platform.

3. The track start wedge of claim 2, wherein the slider at each of the two sides of the housing is constructed of ultra-high-molecular-weight polyethylene.

4. The track start wedge of claim 2, wherein:
   the housing comprises an overhang at each of the two sides, and
   the slider at each of the two sides of the housing is disposed in the overhang at each of the two sides of the housing.

5. The track start wedge of claim 1, wherein the pinion gear at each of the first end and the second end of the bar is operable to mate with and linearly traverse a location rack on side rail assemblies attached to each of two sides of a starting platform.

6. The track start wedge of claim 1, wherein the pinion gear at each of the first end and the second end of the bar and the ratchet gear are welded to the bar.

7. The track start wedge of claim 1, wherein:
   the bar comprises a slot at each of the first end and the second end, and
   the pinion gear at each of the first end and the second end of the bar comprises a protrusion configured to mate with the slot at each of the first end and the second of the bar to align the pinion gear at the first end of the bar with the pinion gear at the second end of the bar.

8. The track start wedge of claim 1, wherein the front of the housing has an angled track start surface comprising a non-slip material.

9. The track start wedge of claim 1, wherein the ratchet gear assembly comprises at least one locating washer operable to abut a portion of the housing to align the bar within the housing.

10. The track start wedge of claim 1, wherein the locking pawl assembly comprises a locking pawl housing coupled to the rear of the housing.

11. The track start wedge of claim 10, wherein the locking pawl comprises a first end and a second end, the first end of the locking pawl pivotally coupled to the locking pawl housing and the second end of the locking pawl disengageably coupled to the ratchet gear.

12. The track start wedge of claim 11, wherein the locking pawl assembly comprises at least one lever arm having a first end and a second end, the first end of the at least one lever arm pivotally coupled to the second end of the locking pawl.

13. The track start wedge of claim 12, wherein the locking pawl assembly comprises a hanger screw having a first end and a second end, the second end of the at least one lever arm pivotally coupled to the first end of the hanger screw.

14. The track start wedge of claim 13, wherein the locking pawl assembly comprises a wedge adjustment knob coupled to the second end of the hanger screw.

15. The track start wedge of claim 14, wherein the wedge adjustment knob is configured to be pulled to disengage the locking pawl from the ratchet gear.

16. The track start wedge of claim 15, wherein the locking pawl assembly comprises a stopping washer configured to restrict a distance that the wedge adjustment knob is pulled.

17. The track start wedge of claim 1, wherein the locking pawl assembly comprises a wedge adjustment knob coupled to the locking pawl, wherein operation of the wedge adjustment knob disengages the locking pawl from the ratchet gear.

18. The track start wedge of claim 17, wherein the wedge adjustment knob is accessed outside of the housing.

19. The track start wedge of claim 1, wherein the spring is a double torsion spring.

20. The track start wedge of claim 1, wherein the rear of the housing comprises at least one fin configured to apply pressure to the bar to rotate the ratchet gear assembly in the first direction.

\* \* \* \* \*